(12) United States Patent
Brun-Buisson et al.

(10) Patent No.: US 9,166,257 B2
(45) Date of Patent: Oct. 20, 2015

(54) METHOD FOR CHARGING AND METHOD FOR DETERMINING AN END-OF-CHARGE CRITERION OF A NICKEL-BASED BATTERY

(75) Inventors: David Brun-Buisson, Vatilieu (FR); Antoine Labrunie, Paris (FR); Pierre Perichon, Voiron (FR)

(73) Assignees: COMMISSARIAT A L'ENERGIE ATOMIQUE ET AUX ENERGIES ALTERNATIVES, Paris (FR); BUBENDORFF, Attenschwiller (FR)

( * ) Notice: Subject to any disclaimer, the term of this patent is extended or adjusted under 35 U.S.C. 154(b) by 603 days.

(21) Appl. No.: 13/499,177

(22) PCT Filed: Sep. 24, 2010

(86) PCT No.: PCT/FR2010/000638
§ 371 (c)(1),
(2), (4) Date: Mar. 29, 2012

(87) PCT Pub. No.: WO2011/039428
PCT Pub. Date: Apr. 7, 2011

(65) Prior Publication Data
US 2012/0181992 A1    Jul. 19, 2012

(30) Foreign Application Priority Data
Sep. 29, 2009  (FR) ..................................... 09 04661

(51) Int. Cl.
*H02J 7/04* (2006.01)
*H02J 7/16* (2006.01)
*H01M 10/44* (2006.01)
*H01M 10/30* (2006.01)
*H01M 10/34* (2006.01)

(52) U.S. Cl.
CPC .............. *H01M 10/44* (2013.01); *H01M 10/30* (2013.01); *H01M 10/345* (2013.01); *H01M 10/443* (2013.01); *Y02E 60/124* (2013.01)

(58) Field of Classification Search
CPC ........ H02J 7/0091; H02J 7/008; Y02E 60/12; H01M 10/44; H01M 10/443
USPC .......................................................... 320/153
See application file for complete search history.

(56) References Cited

U.S. PATENT DOCUMENTS

| 4,308,493 | A | * | 12/1981 | Kothe et al. ................... 320/152 |
| 5,703,468 | A | * | 12/1997 | Petrillo ......................... 320/101 |
| 6,094,032 | A |   | 7/2000 | Bariand et al. |
| 2003/0169017 | A1 | * | 9/2003 | Ariga et al. ................... 320/125 |
| 2008/0018304 | A1 | * | 1/2008 | Litingtun et al. ............. 320/134 |
| 2008/0278111 | A1 |   | 11/2008 | Genies et al. |

FOREIGN PATENT DOCUMENTS

| CN | 1674350 A | 9/2005 |
| EP | 0 768 745 A2 | 4/1997 |
| EP | 0 980 130 A1 | 2/2000 |
| EP | 1 577 677 A1 | 9/2005 |
| EP | 1 990 890 A1 | 11/2008 |
| FR | 2 808 927 A1 | 11/2001 |

OTHER PUBLICATIONS

Jan. 18, 2011 International Search Report issued in International Patent Application No. PCT/FR2010/000638.

* cited by examiner

*Primary Examiner* — Arun Williams
(74) *Attorney, Agent, or Firm* — Oliff PLC

(57) ABSTRACT

The method for charging an electrochemical nickel-based battery having a predetermined nominal capacity, including at least one measurement of the voltage of the battery and one measurement of the temperature representative of the battery. The battery is connected to an intermittent source of energy. The charging of the battery is stopped when the voltage measured at the terminals of the battery reaches a voltage threshold, depending on the measured temperature and representative of a capacity charged in the battery corresponding to a charging efficiency equal to or higher than 90% of the maximum charging efficiency.

14 Claims, 3 Drawing Sheets

METHOD FOR CHARGING AND METHOD FOR DETERMINING AN END-OF-CHARGE CRITERION OF A NICKEL-BASED BATTERY

BACKGROUND OF THE INVENTION

The invention relates to a method for charging an electrochemical nickel-based battery having a predetermined nominal capacity, comprising at least one measurement of the battery voltage and one measurement of the temperature representative of the battery, said battery being recharged by an intermittent and variable-current source of energy.

STATE OF THE ART

These last years, new technologies have enabled to develop the use of mobile electronic devices such as laptops, mobile phones or autonomous systems. These technologies have made necessary the improvement of energy storing systems in order to obtain a satisfactory energy storage density for apparatuses which are ever more energetically demanding. Nowadays a commonly used storing system is the electrochemical nickel-based battery. The technology of nickel-based battery enables to store an optimal quantity of energy because its volume energy, about 350 Wh/dm$^3$, is one of the highest known to date.

The manufacturers of nickel-based batteries recommend a charge at a constant current, the maximum capacity of the batteries is in general obtained with a charge of 160% of the nominal capacity. One of the problems is to know when charging must be stopped, i.e. which quantifiable and measurable criterion to use to determine when the maximum capacity is reached.

The most used method is commonly called the negative delta V method. In fact, during quick charging of a NiCd battery, the voltage at the battery terminals reaches a maximum value Vmax when the charge reaches a value close to 100% to 120% of the nominal capacity of the battery. Then, the voltage at the battery terminals goes down again and when the variation of this voltage becomes higher than a certain threshold, the battery is regarded as charged.

Another method, preferably associated with batteries of NiMh type, consists in detecting the absence of a variation in voltage at the battery terminals. Indeed, for this type of battery, the variation of the delta V is relatively small and not easily detectable. Thus, after a peak of voltage is measured, we wait till the voltage is stabilized.

In the case of NiMh batteries, it is also possible to make a report on the time variation of the battery temperature. When this report exceeds a certain threshold, the battery is regarded as charged.

All these methods enables to have a maximum capacity of the battery by overcharging it. The overcharge is traditionally comprised between 20 and 60% of the nominal capacity, which corresponds to an excess. The overcharge is imposed by the occurrence of parasitic electrochemical phenomena related to water decomposition which consumes energy and need to be compensated for, in order that a user gets the greatest capacity when using an electronic device supplied from said battery.

Document EP1990890 discloses a method for charging a battery of an autonomous system. The method comprises the measurement of a temperature and allows to go from a first charging mode to a second charging mode when a voltage threshold is reached. The end of charge is traditionally carried out by a fast rise in the battery temperature.

OBJECT OF THE INVENTION

The object of the invention is to implement a method for charging a nickel-based battery which provides a good autonomy, a high lifetime and a high efficiency when the battery is connected to an intermittent and variable power source.

This objective is reached by the annexed claims and in particular in that the battery charging is stopped when the voltage measured at the battery terminals reaches a voltage threshold, depending on the measured temperature and representative of a capacity charged in the battery which corresponds to a charge efficiency equal to or higher than 90%.

The invention also relates to a method for determining an end-of-charge criterion for an electrochemical nickel-based battery. This method comprises:
  plotting an efficiency curve representative of the charging efficiency according to the charged capacity,
  selecting a value of maximum charge capacity corresponding to a break in slope of the efficiency curve,
  plotting at least one voltage curve representative of the battery voltage according to the charged capacity, for a given temperature representative of the battery temperature,
  determining from the corresponding voltage curve, for each temperature, a voltage threshold representative of the end-of-charge criterion, corresponding to said value of maximum charge capacity.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
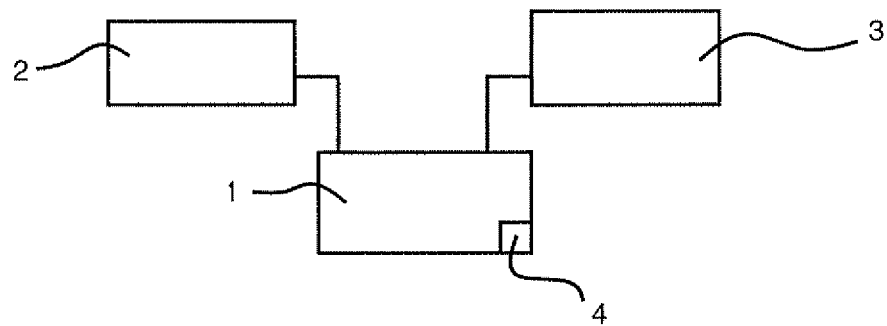
FIG. 1 illustrates a device using the charging method according to the invention.

A nickel-based battery can be integrated into systems called autonomous systems. In an autonomous system illustrated in FIG. 1, the battery 1 is connected to an intermittent and variable-current source of energy 2, enabling the recharging of the battery. This source of energy generally uses renewable energies such as solar energy, wind energy, water power or geothermal energy. As an example, the battery 1 can be recharged by means of solar panels. Consequently, the passage of a simple cloud can decrease the intensity of the charging current or stop the charging of the battery if the sunlight conditions are too unfavorable.

Because it is not possible to control the charging current, the charging methods of the prior art for nickel-based batteries are unusable. Indeed, it is not possible here to enable a fast charging at a constant current.

Figure 2:
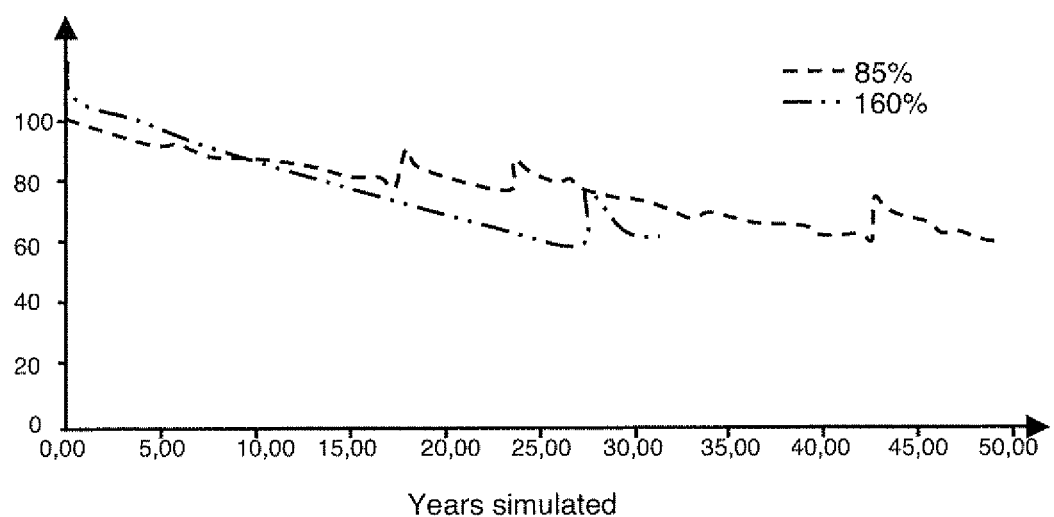
FIG. 2 is a time curve representative of the number of possible actuations of two identical autonomous systems whereof the batteries are being charged in different ways.

In a general way, it is necessary to provide the most autonomy as possible to a user, this is why the current nickel-based batteries are overcharged so that their capacity can correspond to 100% of their nominal capacity. However, this autonomy race does not take into account an important criterion. This criterion is the lifetime of the batteries, i.e. their autonomy in the long term. Indeed, the overcharge of the nickel-based battery 1 is necessary to compensate for the parasitic reactions at the end of the battery charging in order to provide the best autonomy as possible to a user. In the long term, these parasitic reactions have direct consequences on the autonomy of the battery 1. This phenomenon can be seen in FIG. 2, which illustrates the number of possible actuations of an engine 3 connected to the battery 1 according to the years simulated from two similar autonomous systems, each of them comprising an engine 3 and a battery 1. An actuation corresponds in this test to a given operating time for the engine at a constant current. The battery 1 of a first system is always recharged by using as an end-of-charge criterion, a criterion representative of a charged capacity of 160% of the nominal capacity for the battery 1. The battery of a second system is always recharged by using as an end-of-charge criterion, a criterion representative of a charged capacity of 85% of the nominal capacity for the battery 1. In FIG. 2, the first and second autonomous systems are respectively associated with a different curve. The curve associated with the charged capacity of 160% of the nominal capacity of the battery corresponds in fact to an overcharge as recommended in the prior art. Both curves in FIG. 2 enables to observe a less important reduction in the battery autonomy in terms of a number of actuations of the engine for the curve associated with the criterion of charging end of 85% compared to the curve associated with the end-of-charge criterion of 160%. Indeed, after approximately eight simulated years, the system associated with the curve of charged capacity of 85% has a better autonomy than the overcharged system.

What is meant by 'charged capacity' is the quantity of current stored in the battery during charging in order to obtain a capacity in Ah of the battery during discharging. The capacity of the battery is in general lower than the capacity charged, i.e. for N Ah stored in the battery, the battery is able to restore N-x Ah. It is then possible to establish the efficiency for a given charge by making the ratio of the capacity charged to the capacity recovered during discharging. The efficiency will be different according to the current used for charging and/or discharging.

The charging method according to the invention consists in charging an electrochemical nickel-based battery with a predetermined nominal capacity according to a preset end-of-charge criterion, enabling to limit the capacity charged in the battery in order to work in an electrochemical window in which the parasitic reactions do not take place, or are negligible. The end-of-charge criterion can correspond to a voltage threshold, preferably predetermined by calibration.

Thus, the charging method for an electrochemical nickel-based battery 1 having a predetermined nominal capacity and connected to an intermittent source of energy 2 with a variable current, i.e. recharged from it, comprises at least one measurement of the battery voltage and one measurement of the temperature representative of the battery 1. The battery charging is stopped when the voltage measured at the battery terminals reaches a voltage threshold, preferably predetermined and forming the end-of-charge criterion, depending on the measured temperature and representative of a charged capacity for the battery corresponding to a charging efficiency equal to or higher than 90% of the best efficiency for this charge. The best efficiency depends on the value of current used.

This voltage threshold whose charging efficiency is equal to or higher than 90% can correspond to a charged capacity for the battery between 75 and 85% of the nominal capacity of the battery. Such a end-of-charge criterion enables to prevent the battery from being deteriorated by preventing the charge from exceeding this threshold. Thus, what is meant by 'end-of-charge criterion' is a criterion associated with the interruption of the charging beyond which the battery charging is not allowed. In other words, as long as the battery voltage remains higher than the end-of-charge criterion, its charging is prohibited.

Moreover, in order to limit battery degradations, charging can be allowed only in a range of temperature in which the efficiency during charging remains correct. In other words, the method integrates two set values of temperature Tmin and Tmax between which charging is allowed. Indeed, temperature influences the kinetics of the chemical reactions, the mobility of the charge carriers, and the importance of the parasitic reactions. At a low temperature, the decrease in the mobility of the charge carriers causes the increase in the internal impedance of the battery. This decrease in the mobility of the charge carriers thus limits the current provided by the battery, and increases the constant-current charging voltage, which directly generates internal degradations. At a high temperature, the degrading parasitic reactions are favored, which implies a major reduction in the charging efficiency and an acceleration of the self-discharge. These temperatures can be selected according to the range of operating temperatures recommended by the manufacturer.

The voltage threshold can be constant within a range of temperature and different in various ranges of temperature. In a variant taking account of both set values of temperature, the range in which charging is allowed is then divided into several under-ranges, each range being associated with a maximum operating voltage. This enables to take account of the behavior of the battery according to the temperature. Indeed, the higher the temperature is the lower the voltage threshold is.

Figure 3:
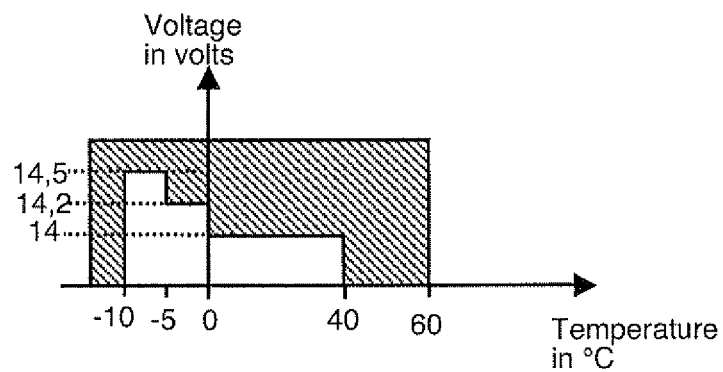
FIG. 3 is a graph representative of a window, depending on the voltage and temperature of the battery, in which the charge is allowed.

FIG. 3 illustrates a particular example of the charging control according to the measured temperature and to the measured voltage for a battery, composed of ten cells of the NIMH type with a nominal capacity of 2.1 Ah and a nominal voltage of 12 V. The set values of temperature Tmin and Tmax are respectively equal to −10° C. and 40° C. A first range associated with a voltage of 14.5 V is defined between −10° C. and −5° C., a second range associated with a voltage of 14.2 V is defined between −5° C. and 0° C., and a third range associated with a voltage of 14 V is defined between 0° C. and 40° C.

In order to define this window in which charging is allowed, in other words the end-of-charge criterion, the voltage thresholds and their associated range of temperatures were determined during a calibration phase of the battery. The calibration phase is preferably carried out on a standard battery during constant-current charging and discharging cycles, wherein the battery characteristics are controlled (detection of the end-of-charge, integration of the charged capacity, etc).

Figure 4:
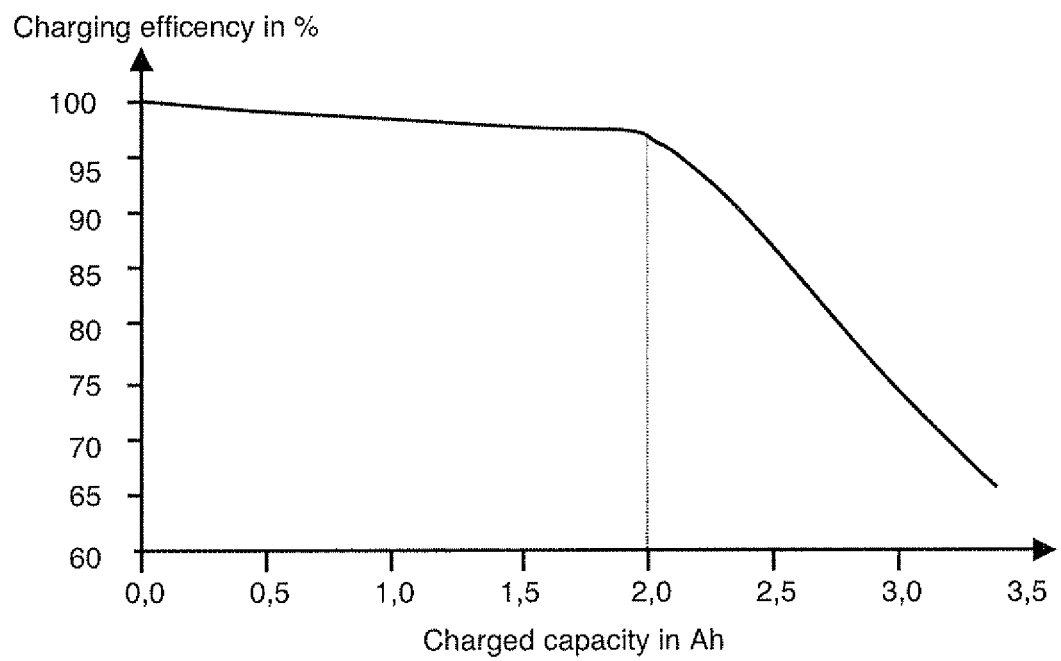
FIG. 4 represents a curve of the total charging efficiency according to the charged capacity.

The calibration phase first comprises the plotting of an efficiency curve representative of the charging efficiency according to the charged capacity in the battery. This efficiency curve can be established by means of a succession of charging and discharging cycles on the standard battery. The variation between the charged capacity in the battery and the capacity provided by the battery during a discharge phase after the charge enables to plot this efficiency. Such a curve is illustrated in FIG. 4. According to the batteries, reading this curve enables to notice a point of break in slope at which the total efficiency falls. This point of break in slope can be a selection of a value of a maximum charge capacity, and can correspond for example to a division by two of the slope of the efficiency curve. In FIG. 4, this point is approximately at a charged capacity of 2 Ah. According to the characteristics of the cycles, the maximum level of the efficiency varies but the general shape of the curve is fixed.

Figure 5:
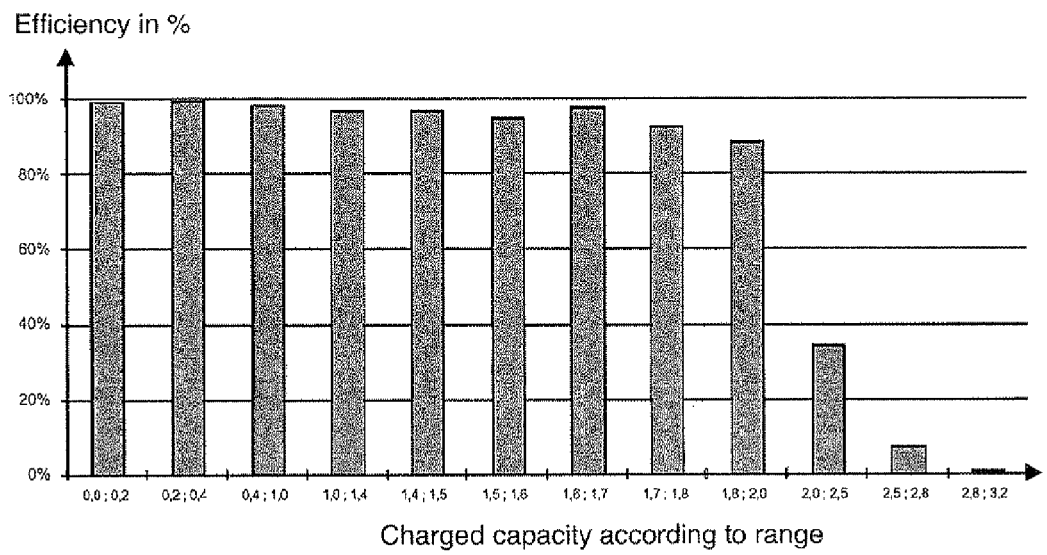
FIG. 5 is a curve in the form of a histogram representative of the charging efficiency according to a plurality of ranges of capacity charged in the battery.

According to a particular example, the efficiency curve corresponds to a histogram illustrated in FIG. 5 representative of the efficiency according to ranges of charged capacity, this point corresponds then to a maximum charge capacity associated with a drop of efficiency. The efficiency for a range is then determined by two charging cycles, each one being followed by a discharging phase, by using the following formula:

$$R_{gammeX;Y} = \frac{C_{dechY} - C_{dechX}}{C_{chY} - C_{chX}} \times 100 \qquad \text{Equation (1)}$$

$R_{gammeX;Y}$ being the value in percentage of the efficiency in the considered range defined by the values Y and X, respectively reached at the time of a first and a second charging cycle, Y being higher than X,
$C_{chX}$ being the capacity in Ah provided to the battery during the first charging cycle,
$C_{dechX}$ being the capacity of the battery in Ah recovered during a discharging phase after the first charging cycle,
$C_{chY}$ being the capacity in Ah provided to the battery during the second charging cycle,
$C_{dechY}$ being the capacity of the battery in Ah recovered during a discharging phase after the second charging cycle.

For example, a first charging cycle was carried out during which the capacity in Ah provided to the battery was equal to 2.81 Ah, it was possible to recover 2.14 Ah during discharging. Then, a second charging cycle was carried out during which the capacity in Ah provided to the battery was equal to 3.21 Ah, it was possible to recover 2.15 Ah during discharging. Entering these data into equation (1) enables to obtain:

$$R_{gamme2.8;3.2} = \frac{C_{dech3.2} - C_{dech2.8}}{C_{ch3.2} - C_{ch2.8}} \times 100 = \frac{2.15 - 2.14}{3.2 - 2.8} \times 100 = 2.5\%$$

As this efficiency of 2.5% is very low, it corresponds to the fact that the energy is almost entirely consumed by the parasitic reactions degrading the battery physically.

The choice of the point of maximum charge capacity for allowing the best lifetime for the battery is not trivial. It is advisable to determine this point by analyzing the charging efficiency according to the charged capacity compared to the nominal capacity of the battery. In FIG. 5, this point is preferably determined by the range preceding a drastic fall of the efficiency. For the particular example in the figure, it is the last range having a charging efficiency higher than 90%. In this last range, the lower limit is preferably chosen, which corresponds to 1.8 Ah in the example of FIG. 5. This value of 1.8 Ah corresponds to the curve of 85% of the charged capacity in FIG. 2.

FIG. 5 was obtained by carrying out at least ten ranges between 0 and the nominal capacity of the battery. A minimum of ten ranges enables to better notice the point of maximum charging capacity to be selected.

The value obtained with the curve in FIG. 5 is lower than that with the curve in FIG. 4. Thus, the autonomy will be lower with a maximum charge capacity of 1.8 Ah than with a maximum charge capacity of 2 Ah. However the lifetime will be increased.

Once the value of maximum charged capacity is selected (1.8 Ah in this example), this value can be validated by carrying out a lifetime test, as illustrated in FIG. 2 with the value of maximum charge capacity and a higher value.

Figure 6:
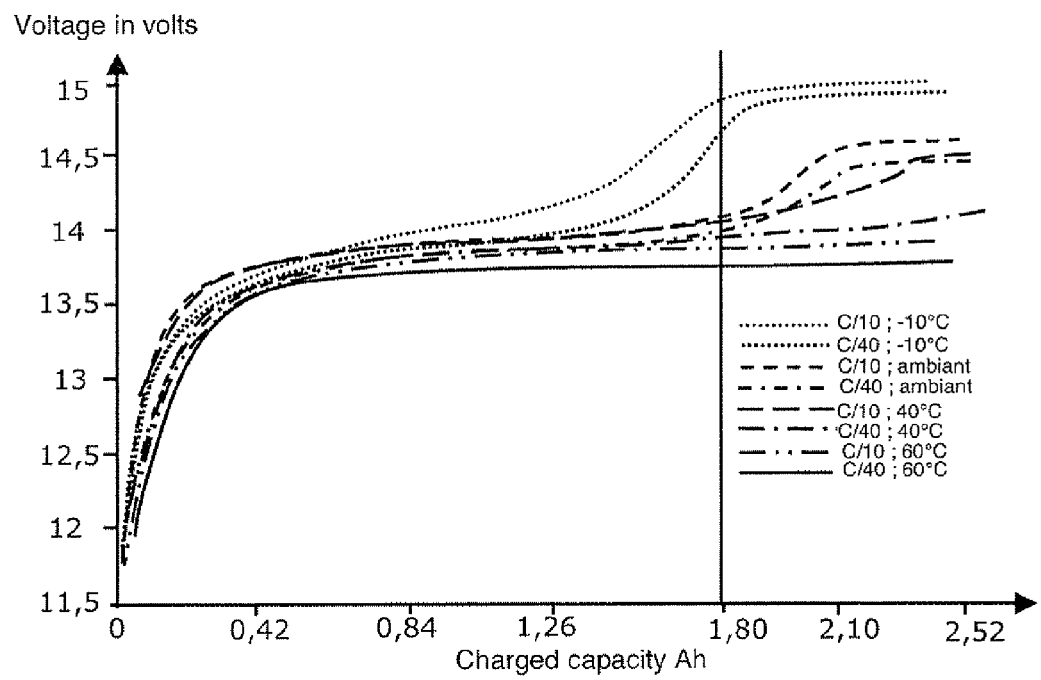
FIG. 6 illustrates for a plurality of temperatures the evolution of the voltage at the battery terminals according to the charged capacity.

The method for determining the end-of-charge criterion then comprises plotting at least one voltage curve representative of the battery voltage according to the charged capacity, for a given temperature representative of the temperature of the battery. FIG. 6 illustrates eight curves, each curve represents the evolution of the voltage in volts according to the charged capacity of the battery in Ah, and is associated with a temperature (−10° C., ambient, +40° C. and +60° C.) and with a charging current (C/10 and C/40). For a given temperature, there is thus a couple of curves, the first curve of the couple being obtained for a 10 hours charge and the second curve of the couple for a 40 hours charge. Thus, it is noted that the influence of the charging current is slight when this current is low.

Moreover, in the particular example in FIG. 6, the range of temperature is limited to −10° C. to 40° C. Indeed, the slope of the curve associated with the temperature of 60° C. is so small near the value of 1.8 Ah that it is not possible to determine the end of charge.

Then, for each temperature, a voltage threshold corresponding to the maximum value of charge is determined. The threshold can be determined from the corresponding voltage curve, the voltage threshold is then representative of the end-of-charge criterion. These thresholds then enables to plot a graph of the type in FIG. 3 to form the window in which charging is allowed. The voltage threshold, depending on temperature, determines the end-of-charge criterion. The data representative of FIG. 3 can be recorded in a correlation table comprising several ranges of temperatures, each one being associated with a different voltage threshold. More particularly, the table can comprise a plurality of objects, each object comprising two inputs, a first input being representative of the range of temperature, and a second input representative of the voltage associated with said range.

The temperature representative of the battery can be determined by a sensor 4 (FIG. 1) placed near the terminals of the battery or in the battery.

As a particular embodiment example, when connecting an electrochemical nickel-based battery to a charger provided with a battery charge manager, the charger can recharge the battery by using a end-of-charge criterion depending on the battery voltage and temperature. Thus, during a charging phase, a measurement loop of the temperature and the voltage is carried out at the battery terminals and, according to these measurements, the charger decides whether it can carry on with the charging of the battery.

The use of such a charging method enable to decrease maintenances of autonomous systems which result in replacing the batteries regularly.

The invention claimed is:
1. A method for charging an electrochemical nickel-based battery having a predetermined nominal capacity, the method comprising the following steps:
measuring a battery voltage at terminals of the battery;

measuring a temperature representative of the battery,
charging the battery with an intermittent and variable-current source of energy, the charging of the battery being stopped when the voltage measured at the terminals of the battery reaches a voltage threshold, the voltage threshold being dependent on the measured temperature such that an increase in the measured temperature from −10° C. to 40° C. decreases the voltage threshold in steps, the voltage threshold being constant in each step, and the voltage threshold being representative of a capacity charged in the battery corresponding to a charging efficiency equal to or higher than 90%.

2. The method according to claim 1, wherein the voltage threshold, depending on the measured temperature, is representative of a capacity charged in the battery comprised between 75% and 85% of a nominal capacity of the battery.

3. The method according to claim 1, comprising two set values of temperature between which charging is allowed.

4. The method according to claim 1, wherein the voltage threshold is constant within a range of temperature and different in various ranges of temperature.

5. The method according to claim 1, wherein the voltage threshold is representative of an end-of-charge criterion obtained beforehand by the following steps:
  plotting an efficiency curve representative of the charging efficiency according to the capacity charged in the battery,
  selecting a value of maximum charge capacity corresponding to a break in slope of the efficiency curve,
  plotting at least one voltage curve representative of the battery voltage according to the charged capacity, for a given temperature representative of the battery temperature, and
  determining from the corresponding voltage curve, for each temperature, a voltage threshold representative of the end-of-charge criterion, corresponding to the value of maximum charge capacity.

6. The method according to claim 1, wherein
the increase in the measured temperature from −10° C. to 40° C. decreases the voltage threshold:
  from a first step to a second step when the measured temperature reaches a first temperature strictly superior to −10° C., and
  from the second step to a third step when the measured temperature reaches a second temperature, the second temperature being strictly superior to the first temperature and strictly inferior to 40° C.

7. A method for determining an end-of-charge criterion of an electrochemical nickel-based battery and for charging the electrochemical nickel-based battery, the method comprising the following steps:
  plotting, by a battery charger, an efficiency curve representative of a charging efficiency according to a capacity charged in the battery,
  selecting, by the battery charger, a value of maximum charge capacity corresponding to a break in slope of the efficiency curve,
  plotting, by the battery charger, at least one voltage curve representative of a battery voltage according to the charged capacity, for a given temperature representative of a battery temperature,
  determining, by the battery charger, from the corresponding voltage curve, for each temperature, a voltage threshold representative of the end-of-charge criterion such that an increase in the temperature from −10° C. to 40° C. decreases the voltage threshold in steps, the voltage threshold being constant in each step, and the voltage threshold corresponding to the value of maximum charge capacity, and
  charging the electrochemical nickel-based battery based on the end of-charge-criterion such that the electrochemical nickel-based battery is charged at the corresponding voltage curve based on a measured temperature of the electrochemical nickel-based battery.

8. The method according to claim 7, comprising generating a correlation table comprising several ranges of temperatures, each one being associated with a different voltage threshold.

9. The method according to claim 7, wherein, the efficiency curve being a histogram representative of the charging efficiency according to ranges of charged capacity, the value of maximum charge capacity is included in a last range having a charging efficiency higher than 90%.

10. The method according to claim 9, wherein the value of maximum charge capacity corresponds to the lower limit of the last range.

11. A method for charging an electrochemical nickel-based battery having a predetermined nominal capacity, the method comprising the following steps:
  measuring a battery voltage at terminals of the battery;
  measuring a temperature representative of the battery,
  charging the battery with an intermittent and variable-current source of energy, the charging of the battery being stopped when the voltage measured at the terminals of the battery reaches a voltage threshold, the voltage threshold being dependent on the measured temperature such that an increase in the measured temperature from −10° C. to 40° C. decreases the voltage threshold in steps, the voltage threshold being constant in each step on a temperature interval superior or equal to 5° C., and the voltage threshold being representative of a capacity charged in the battery corresponding to a charging efficiency equal to or higher than 90%.

12. A method for determining an end-of-charge criterion of an electrochemical nickel-based battery and for charging the electrochemical nickel-based battery, the method comprising the following steps:
  plotting, by a battery charger, an efficiency curve representative of a charging efficiency according to a capacity charged in the battery,
  selecting, by the battery charger, a value of maximum charge capacity corresponding to a break in slope of the efficiency curve,
  plotting, by the battery charger, at least one voltage curve representative of a battery voltage according to the charged capacity, for a given temperature representative of a battery temperature,
  determining, by the battery charger, from the corresponding voltage curve, for each temperature, a voltage threshold representative of the end-of-charge criterion such that an increase in the temperature from −10° C. to 40° C. decreases the voltage threshold in steps, the voltage threshold being constant in each step on a temperature interval superior or equal to 5° C., and the voltage threshold corresponding to the value of maximum charge capacity, and
  charging the electrochemical nickel-based battery based on the end of-charge-criterion such that the electrochemical nickel-based battery is charged at the corresponding voltage curve based on a measured temperature of the electrochemical nickel-based battery.

13. A method for charging an electrochemical nickel-based battery having a predetermined nominal capacity, the method comprising the following steps:

measuring a battery voltage at terminals of the battery;

measuring a temperature representative of the battery, charging the battery with an intermittent and variable-current source of energy, the charging of the battery being stopped when the voltage measured at the terminals of the battery reaches a voltage threshold, the voltage threshold being dependent on the measured temperature such that an increase in the measured temperature from −10° C. to 40° C. decreases the voltage threshold in steps, the voltage threshold being constant in a first step from 40° C. to 0° C., a second step from 0° C. to −5° C., and a third step from −5° C. to −10° C., and the voltage threshold being representative of a capacity charged in the battery corresponding to a charging efficiency equal to or higher than 90%.

14. A method for determining an end-of-charge criterion of an electrochemical nickel-based battery and for charging the electrochemical nickel-based battery, the method comprising the following steps:

plotting, by a battery charger, an efficiency curve representative of a charging efficiency according to a capacity charged in the battery, selecting, by the battery charger, a value of maximum charge capacity corresponding to a break in slope of the efficiency curve, plotting, by the battery charger, at least one voltage curve representative of a battery voltage according to the charged capacity, for a given temperature representative of a battery temperature, determining, by the battery charger, from the corresponding voltage curve, for each temperature, a voltage threshold representative of the end-of-charge criterion such that an increase in the temperature from −10° C. to 40° C. decreases the voltage threshold in steps, the voltage threshold being constant in a first step from 40° C. to 0° C., a second step from 0° C. to −5° C., and a third step from −5° C. to −10° C., and the voltage threshold corresponding to the value of maximum charge capacity, and charging the electrochemical nickel-based battery based on the end of-charge-criterion such that the electrochemical nickel-based battery is charged at the corresponding voltage curve based on a measured temperature of the electrochemical nickel-based battery.

\* \* \* \* \*